UNITED STATES PATENT OFFICE.

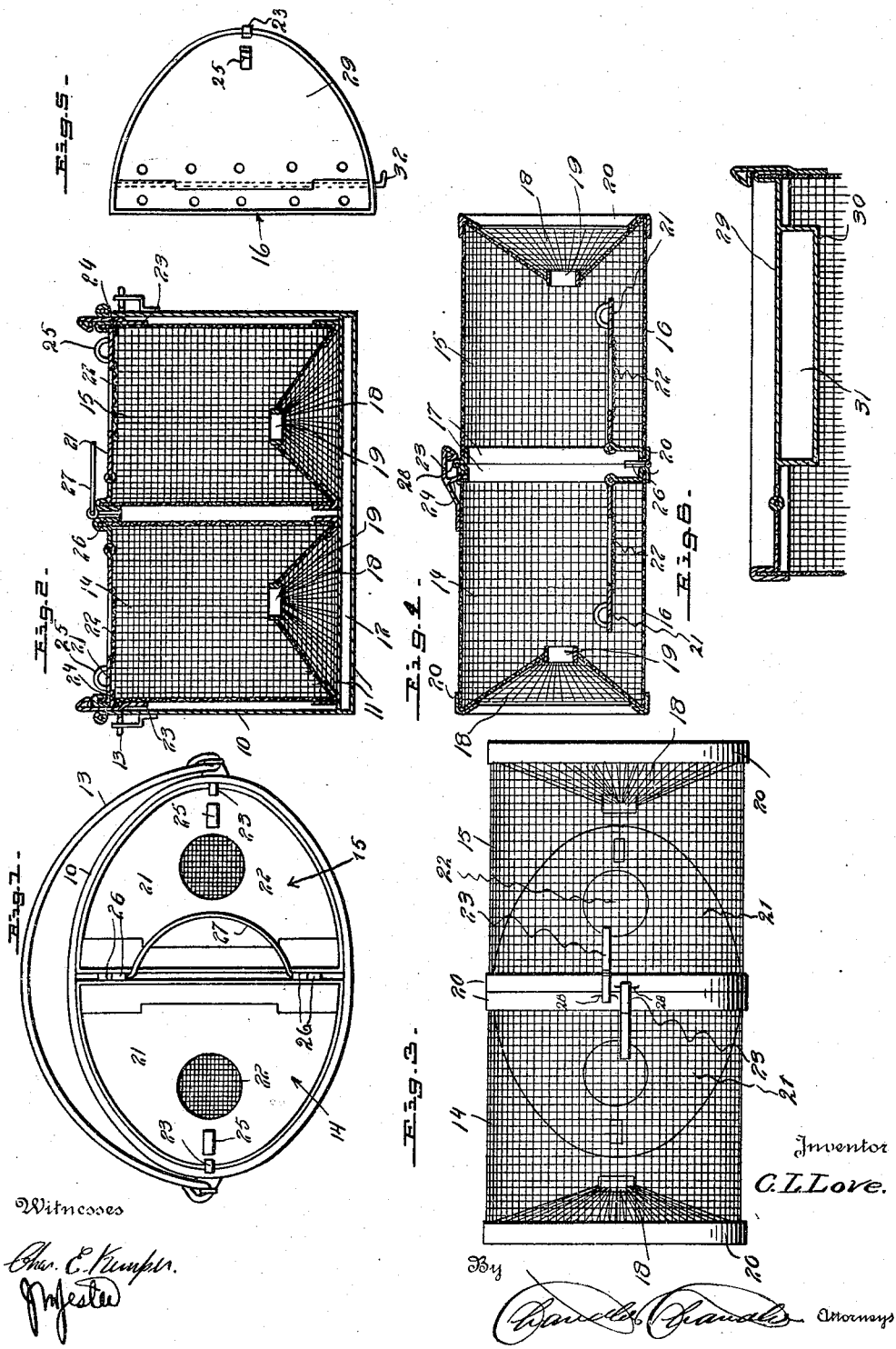

CHARLES L. LOVE, OF MESHOPPEN, PENNSYLVANIA.

MINNOW BUCKET AND TRAP.

1,231,034.   Specification of Letters Patent.   Patented June 26, 1917.

Application filed May 11, 1914. Serial No. 837,831.

*To all whom it may concern:*

Be it known that I, CHARLES L. LOVE, a citizen of the United States, residing at Meshoppen, in the county of Wyoming, State of Pennsylvania, have invented certain new and useful Improvements in Minnow Buckets and Traps; and I do hereby declare the following to be a full, clear, and exact description of the invention, such as will enable others skilled in the art to which it appertains to make and use the same.

This invention relates to a device especially adapted for the use of fishermen, and has for its object the provision of a novel means adapted to serve the two-fold purpose of acting as a bait catcher and as a container for the transportation thereof.

One object is to provide a novel device which, when arranged in one position, will serve as a trap for minnows or other small fish, and which, when arranged in a different position, will serve as a portable container in which the minnows may be kept alive and perfectly accessible for their use as bait.

Another object is the provision of a device of this character which will be non-sinkable when used as a minnow bucket, and which when used as a trap may be sunk into a stream for catching minnows.

A further object is to provide a novel device of this character, the different parts of which are so constructed that they may be quickly and easily attached or detached for holding the different parts in the proper assembled positions for the use of the device in either of its capacities.

Other objects and advantages, such as the ability of the device to accommodate two different kinds of bait, compactness of form and efficiency in operation will become apparent in the course of the following description.

With these and other objects in view, such as simplicity, cheapness of manufacture and the general improvement of the art, my invention consists in the novel construction and arrangement of parts as will be hereinafter fully described and claimed, and furthermore illustrated in the accompanying drawings, in which—

Figure 1 is a top plan view of my device used as a minnow bucket,

Fig. 2 is a vertical sectional view therethrough,

Fig. 3 is a plan view of the device arranged as a trap,

Fig. 4 is a longitudinal vertical sectional view therethrough,

Fig. 5 is a fragmentary top plan view of one of the sections showing a modified form of cover, and Fig. 6 is a sectional view therethrough.

Referring more particularly to the drawings and referring especially to Figs. 1 to 4 inclusive, the numeral 10 designates the outer container or bucket which may be of any desired shape in cross section, and which is preferably provided with a double bottom 11 forming an air space 12 whereby the container is made non-sinkable. A bail 13 is connected to the casing 10 to form a handle for carrying the device.

The portion of my device disposed within the container 10 when collapsed, and adapted to serve as a trap when extended, comprises two substantially semi-cylindrical sections or compartments, designated as a whole by the numerals 14 and 15, each of which comprises a semi-cylindrical casing formed, preferably, of wire screen or other suitable foraminous material with a flat side 16, an open end 17 and an inwardly extending conical end 18 provided at its apex with a small opening 19. The top and bottom edges of each section are reinforced by strips 20 of solid material for strength and rigidity.

The open end 17 of each section is adapted to be closed by a hinged cover 21 provided with a screen covered opening 22. The screen covered opening is preferably located apart from the edge of the cover and admits a supply of air to the container to aid in keeping the bait alive. The imperforate portion of the cover adjacent the side of the container, prevents the liquid from slopping out over the edges of the container when the latter is transported or otherwise subjected to jars. It will also be noted from an inspection of Figs. 1 and 2, that the trap sections 14 and 15 fit snugly into the container 10 which is preferably shaped to accommodate the trap when in folded position, and that the upper ends of the trap sections lie substantially in the same plane with the upper open end of the container, so that the covers 21 also serve to close the open end of the container, thus obviating the necessity for a separate cover therefor. Each cover 21 is normally prevented from inward movement by a catch 23 secured upon the side of the section and provided with an extension 24, projecting through a slot in the section below the edge of the cover 21. The free end of the catch 23 extends beyond the end of the section and is bent as shown to form a latch for a purpose to be described. The covers 21 are each provided with a loop or handle 25 by means of which they may be swung open.

When the sections 14 and 15 are folded together, as in Figs. 1 and 2, the flat sides 16 lie parallel and adjacent one another, the upper edges of the flat sides being preferably hinged together. This may be conveniently accomplished by securing hinge leaves 26 to the respective upper edges of the flat sides and connecting them by inserting the ends of a bail 27 through the hinge eyes to serve as pintles. The bail forms a handle by means of which the sections may be lifted bodily from the container 10.

When the device is used as a minnow bucket the parts are arranged as shown in Figs. 1 and 2, whereupon the sections 14 and 15 will serve as separate compartments in which minnows and catfish or crawfish or other bait may be kept alive and readily accessible. The screened openings 22 permit an inspection of the interior of the sections so that the condition of the bait contained therein may be readily seen. It is to be observed that as the sections 14 and 15 are entirely separate, bait of two kinds may be carried in the one receptacle or bucket. This is a very convenient arrangement, as the fishermen frequently wishes to carry different kinds of bait, so that he may change his bait, in case the fish are not taking his first choice. Thus crawfish, and minnows, or catfish, may be carried in the respective sections or compartments, the more voracious bait being prevented from killing the minnows.

When it is desired to use the device as a trap, the sections 14 and 15 are lifted from the container 10 by the bail 27. The catches 23 are then sprung outwardly so that the projections 24 will clear or release the edges of the covers 21, whereupon the covers may be swung inwardly against the flat sides 16 of the sections, as shown in Fig. 3. The sections are then swung upon the bail ends and hinge leaves 26 so that the open ends 17 come together or register, whereupon they will be locked by the engagement of the latches 23 with bent portions or lips 28 formed on the reinforcing strips 20 at the open ends of the sections. If desired a wire, chain or other device may be connected to the looped free ends of the catches 23 for lowering the trap into a stream, or for anchoring purposes in case of a rapid current.

When the device is used as a trap, it will be apparent that fish will come into contact with the conical ends 18 of the sections and will pass through the openings 19 into the interior of the sections, as is well understood in the art.

In Figs. 5 and 6, I have shown a modified cover for the sections 14 and 15. This cover 29 is provided with double walls 30 to form an air space 31 for rendering the device more buoyant when used as a minnow bucket. The cover 29 is hingedly secured at the open end of each section by a removable pintle 32. When it is desired to use the device as a trap, the pintles 32 are removed, and the covers bodily removed from the sections so that the device may sink into the stream.

From the foregoing, it will be seen that I have provided a novel form of combined minnow bucket and trap, wherein all unnecessary parts, such as an extra cover for the container, are omitted. Furthermore, I have provided a combined minnow bucket and trap which will not sink if dropped into the water, as may easily happen.

By providing the trap sections with flat sides, the trap, when folded, is not only more compact and readily fits in the container, but when opened and used as a trap, the flat sides of the sections lie in substantial alinement and rest on the bottom of the stream or pond to prevent movement of the trap and the consequent scaring of the bait to be lured therein.

Furthermore, by providing a minnow trap and pail, having more than one compartment, the bait can be contained in one compartment and ice in the other compartment. This is especially advantageous when the device is used in warm weather, as the bait must often be kept in the pail for several hours and unless kept cool, will die, and it is impractical to place a lump of ice in the same compartment with the bait as it bruises the bait when the pail is transported. The screened openings 22 also permit the angler to readily inspect the bait and remove the dead minnows, which if left in the compartment, seem to poison the water and cause the remaining live bait to die more quickly.

My invention permits the fisherman to keep the bait alive, with less trouble than heretofore, as the sections when folded, as shown in Figs. 1 and 2, may be removed from the bucket by means of the handle 27 and submerged in water, while still in folded position, the different kinds of bait being kept separate in the two compartments. When bait is desired, the fisherman pulls up the folded trap sections, and the water drains out, allowing the sportsman to select and remove the desired bait without trouble, after which the folded trap may be again submerged.

It is obvious that the flat sides which keep the trap stationary when used to catch the bait, are utilized to render the trap more compact when the sections are folded and placed in the bucket container.

It will be readily understood that I reserve the right to make such changes in the form, construction and arrangement of parts as will not depart from the spirit of the invention or the scope of the sub-joined claims.

Having thus described my invention, I claim:

1. In a combined minnow bucket and trap, the combination with a container; of a pair of foldable trap sections removably fitted therein side by side; funnel-shaped closures at the corresponding lower or outer ends of the respective sections; and lids secured to the sections to close the opposite open ends of the sections, the lids adapted to be shifted out of the way when the sections are placed in end to end relation to serve as a trap.

2. In a combined minnow bucket and trap, the combination with a container; of a pair of foldable trap sections, removably fitted therein side by side; funnel-shaped closures at the corresponding lower or outer ends of the respective sections; and hinged lids secured to the sections to close the opposite open ends of the sections, and adapted to be swung inside their respective sections when the latter are placed in end to end relation to serve as a trap.

3. In a combined minnow bucket and trap, the combination with a container; of a pair of foldable trap sections removably fitted therein side by side; funnel-shaped closures at the corresponding lower or outer ends of the respective sections; hinged lids to close the opposite open ends of the sections; and spring latches to engage the free ends of the lids to hold them in closed position, said latches adapted to release the lids to allow the latter to be swung inwardly when the sections are placed in end to end relation to form a trap, to permit communication between the two sections, or to swing outwardly when access to the interiors of the sections is desired.

4. A foldable trap comprising connected sections, each section having a flat side, the flat sides adapted to lie adjacent and substantially parallel with each other when the sections are folded, to form a compact device, said flat sides also adapted to lie in substantially the same plane when the sections are unfolded in end to end relation, to form a bottom which maintains the trap steady when resting on the ground.

5. The combination with a bucket; of a trap removably contained therein and comprising several sections adapted to be fastened together when removed from the bucket and used as a trap; one of said sections having an opening to admit the entrance of the bait fish; and a hinged closure common to both bucket and trap sections, and adapted to be dropped out of the way when the sections are fastened together to form a trap.

6. The combination with a bucket, of a foldable trap removably fitting therein, and comprising sections hinged together at adjacent ends, each section having a flat side, the sides adapted to lie substantially parallel with each other when the sections are folded to form a compact device, the flat sides adapted to lie in substantially the same plane when the sections are unfolded to assume an end to end relation to form a bottom which steadies the trap when resting on the ground; and a handle secured to the sections at their hinged ends to enable the trap to be lifted out of the bucket and supported in folded position.

7. The combination with a container; of a sectional trap, whose sections are adapted to be assembled in end to end relation when used as a trap, or arranged side by side in the container; lids for the respective sections; and releasable catches to normally support the lids across the open ends of the sections, the lids adapted to drop within the sections to afford communication therebetween when the sections are assembled to form a trap.

8. In a foldable trap, the combination with sections; of lids adapted to close the respective sections; catches to support the lids in closed positions when the sections are folded and to secure the sections together when the latter are assembled.

9. The combination with a bucket; of a sectional trap; eyes on the respective sections; and a handle, the ends of which, when inserted in the eyes, form pintles to connect the sections in hinged relation.

10. A combined minnow bucket and trap comprising an outer container, a pair of container sections hingedly secured to each other and disposed side by side in said container, said sections being provided with conical apertured ends, covers hinged on said sections, and catches to form stops to prevent inward swinging of said covers, said sections being adapted to be disposed in end to end relation, said catches being releasable to disengage said covers, and said catches being adapted to lock said sections in their end to end relation.

11. The combination with a container; of trap sections, each of which has a funnel-shaped end and an open end, the sections adapted to be placed side by side in the container, or in end to end relation when removed from the container; means to secure the sections together in end to end relation; lids connected to the open ends of the sections to close the sections when arranged side by side; and means to releasably support the lids in closed position, the sections being of such shape as to enable the lids to be swung inwardly into their respective sections, when desired.

12. The combination with a container; of a sectional trap having open ends; lids secured to the open ends of the trap sections to form closures therefor; and releasable latches for the lids, the lids adapted to swing inwardly into the trap sections or outwardly, from their closed position, when freed from the latches.

In testimony whereof, I affix my signature, in the presence of two witnesses.

CHARLES L. LOVE.

Witnesses:
 IRA R. GRIFFIS,
 GLEN E. CHAMBERLIN.

Copies of this patent may be obtained for five cents each, by addressing the "Commissioner of Patents, Washington, D. C."